United States Patent [19]

Sears

[11] 3,913,063
[45] Oct. 14, 1975

[54] GEOPHONE WITH PLASTIC COILFORM
[75] Inventor: Harold A. Sears, Conroe, Tex.
[73] Assignee: Walker, Hall, Sears, Inc., Houston, Tex.
[22] Filed: Oct. 23, 1973
[21] Appl. No.: 408,774

Related U.S. Application Data
[63] Continuation-in-part of Ser. No. 399,361, Sept. 21, 1973.

[52] U.S. Cl. ............... 340/17; 340/8 PT; 340/8 S; 73/71
[51] Int. Cl.² .......................................... G01V 1/16
[58] Field of Search ............. 340/17, 11, 8 PT, 8 S; 73/71

[56] References Cited
UNITED STATES PATENTS
2,348,225  8/1944  Patty .................................. 340/17
3,100,292  8/1963  Warner et al. ..................... 340/17
3,157,852  11/1964 Campbell et al. ................. 340/17
3,239,804  3/1966  Elskamp et al. ................ 340/17 SP Primary Examiner—Maynard R. Wilbur
Assistant Examiner—N. Moskowitz
Attorney, Agent, or Firm—Michael P. Breston

[57] ABSTRACT

A conventional electromagnetic geophone includes a mass-coil assembly concentrically suspended in an annular air gap established by a permanent magnet. The suspension system includes a pair of spring spiders. The coil is wound on the outer wall of a metallic, conductive but nonmagnetic coilform which serves as a rigid support for the coil. The conductive coilform also develops a damping force for the mass-coil assembly. The improvement of this invention lies in making the coilform out of a suitable plastic material and mounting it on an inner hollow mandrel, thereby greatly reducing the manufacturing cost of the coilform.

3 Claims, 2 Drawing Figures

GEOPHONE WITH PLASTIC COILFORM

REFERENCE TO RELATED APPLICATIONS

This application is a continuation in part of my copending patent application Ser. No. 399,361 filed Sept. 21, 1973 now U.S. Pat. No. 3,878,504 and is related to my copending U.S. pat. application Ser. No. 408,773, now abandoned, both assigned to the same assignee.

BACKGROUND OF THE INVENTION

Various types of geophones are known and used in the seismic industry to detect seismic waves. Present practice employs a geophone having a suspended mass-coil assembly and a magnet assembly. The magnet assembly is rigidly fixed in a magnetic casing. Vibrations of the earth are transferred to the magnetic casing causing relative motion between the suspended coil and the magnetic field. This motion induces a signal in the coil which is proportional to the velocity of the coil relative to the magnetic assembly.

Since geophones are used in great numbers by the seismic industry, there is a need for relatively small, rugged and inexpensive geophones which are characterized by low signal distortion. This can be achieved by designing the geophones so that their assembly requires relatively unskilled labor and that their component parts require a minimum of manufacturing operations.

Damping of the mass-coil assembly is achieved in conventional geophones by making the coilform out of nonmagnetic, conductive metal. In response to an excitation, the relative motion between the mass-coil and the magnet assemblies induces eddy currents in the metallic coilform. These currents produce a damping force on the coilform which tends to dampen the relative velocity of the mass-coil assembly. Such mass-coil damping is known as the "no-load" damping. The present invention is only concerned with no-load damping in electromagnetic geophones.

The requirement for a metallic coilform to achieve no-load damping presents certain well-known manufacturing problems. As initially manufactured, the outer surfaces of the metallic coilform are relatively rough. Accordingly, there is a need to round out the edges and to smoothen out as much as possible the rough spots on the outer surfaces of the coilform. The final finishes of the coilform require deburring operations utilizing abrasion cleaning methods, such as blasting each coilform with a stream of small glass particles. After the deburring operation, each coilform is anodized and then enamel coated and baked to obtain a hard insulating surface. Prior to using a coilform, it must be carefully inspected to eliminate those coilforms in which the finishing operations were not completely successful in removing its rough surfaces and edges. This screening process eliminates a substantial number of undesired coilforms. At times about 25% of the coilforms may have to be rejected.

When a coil of fine insulated wire is wound on a coilform whose outer surface is improperly finished, any sharp point which may extend from its outer surface will pierce the insulation from the wire forming the coil and establish conductivity between the coil and the magnet assembly, thereby essentially short-circuiting the output of the coil.

SUMMARY OF THE INVENTION

In accordance with this invention, the coilform is made from a suitable plastic material. The coilform is then mounted on an inner hollow mandrel which provides adequate no-load damping and the plastic coilform eliminates the inherent drawbacks associated with finishing metallic coilforms. The invention has application to various types of electromagnetic geophones comprising a mass-coil assembly and a magnet assembly. BRIEF DESCRIPTION OF THE DRAWINGS FIG. 1 is a partial sectional view of one type of geophone embodying the invention; and FIG. 2 is a sectional view of the geophone shown in FIG. 1 and taken on line 2—2.

DESCRIPTION OF THE PREFERRED EMBODIMENT

Figure 1:
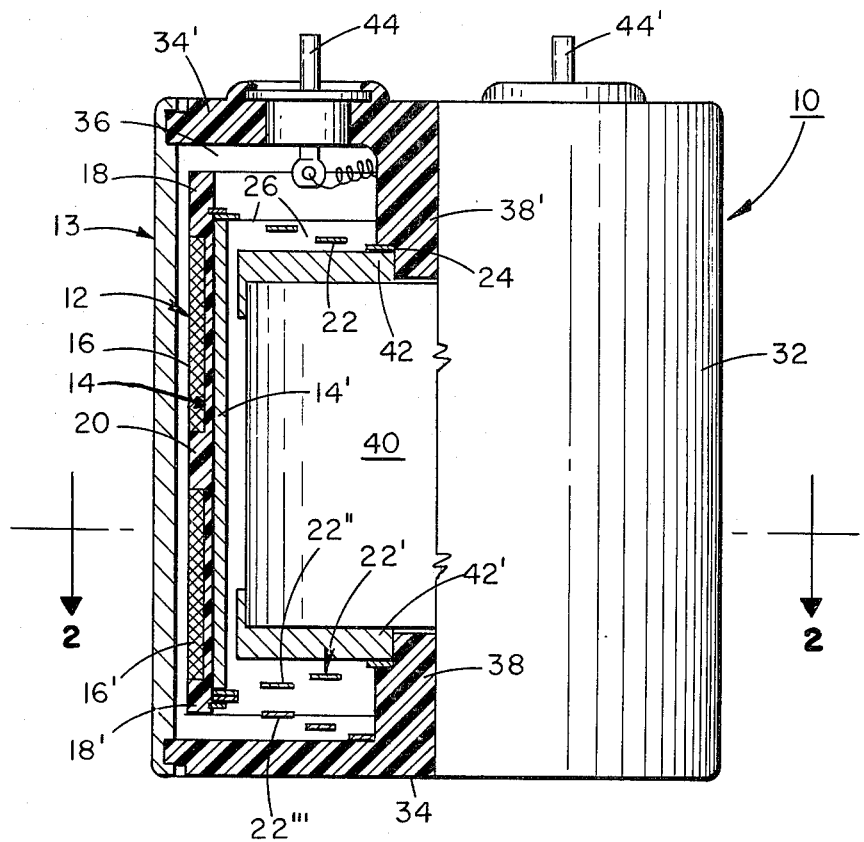
Figure 2:
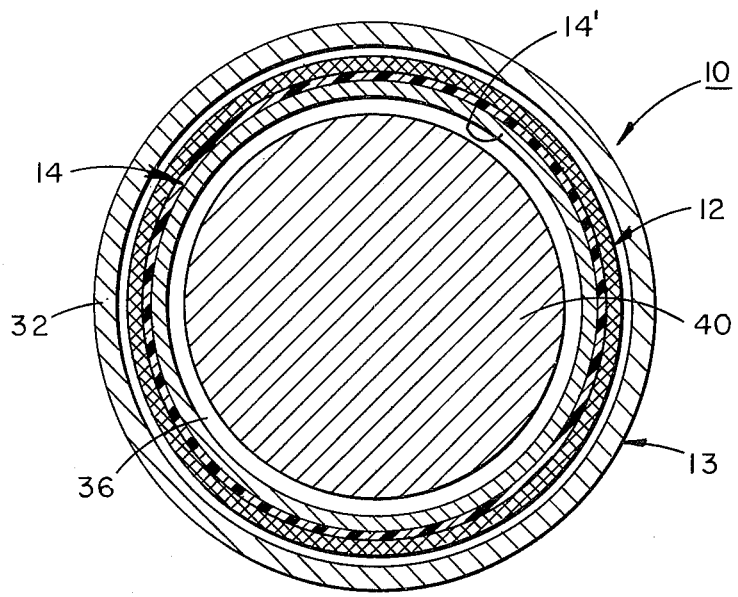

Since the invention is concerned with improvements to electromagnetic geophones which are generally described in various patents, the description hereinafter given will be limited only to the extent necessary for a proper understanding of this invention.

Referring now to the drawings, there is shown one type of geophone embodying the present invention. It will be understood that the invention is not limited to any particular type of electromagnetic geophone but has application to various types of such geophones.

The geophone is generally designated as 10 and comprises a mass-coil assembly 12 concentrically extended from a stationary mass-magnet assembly 13.

The mass-coil assembly includes a unitary, generally-cylindrical coilform 14 having a thin wall provided with radially-extending shoulders to accommodate two coils 16–16', each coil having a plurality of turns of fine insulated wire. The body of the coilform 14 is made of a suitable plastic material. Coilform 14 has two end shoulders 18–18' and one middle shoulder 20. Shoulders 18–18' support spring 22–22', respectively.

The mass-coil assembly 12 is resiliently suspended from the two springs 22–22'. Spring spider 22 has a center opening 24 and a plurality of symmetrically-arranged incisions 26. Spring 22' is a compound spring having a "flat" portion 22" and a conical coil portion 22'''. This compound spring 22' is linear in tension and compression. The construction and arrangement of the springs 22–22' is more fully described in my copending application Ser. No. 399,361, now Patent No. 3,878,504.

The stationary, mass-magnet assembly 13 includes a hollow, outer iron cylinder 32 which is closed at the top and bottom by insulating cover plates 34–34'. In addition to rendering the inner volume 36 of case 32 fluid tight, plates 34–34' serve as support and centering elements as well. Extending inwardly from the bottom plate 34 is a centering insulator post 38. Extending inwardly from the upper plate 34' is an insulator centering post 38'.

The magnetic field is created by a permanent magnet 40 provided with upper and lower pole pieces 42–42', each having a substantially Z-shaped cross section to entrap and centrally maintain the magnet within the casing. A pair of outer terminal posts 44–44' extend outwardly from the upper plate 34' to allow the coils 16–16' to become electrically connected to an outside utilization device. An inspection of the drawings will reveal that the various components of the mass-coil and magnet assemblies are pressure fitted whenever possible and stacked inside the casing 32.

In operation, the mass-coil assembly 12 is the inertial element of the geophone and is suspended by the springs 22–22' in the cylindrical air gap 36' provided by the magnet assembly 13. The earth's vibration causes relative motion between the coil and the magnet assemblies thereby generating a voltage in the coil's 16–16' which becomes available at the output terminals 44–44'.

Inside the coilform is inserted a hollow cylindrical mandrel 14' made of a light-weight, conducting metal preferably aluminum. The outer diameter of mandrel 14' is slightly less than the inner diameter of coilform 14 to obtain a tight fit. The mandrel serves as a damping element by virtue of the eddy currents generated therein. Sufficient clearance is provided by the width of gap 36' so that the concentrically-mounted, mass-coil assembly can move freely in the air gap. The damping element 14' in addition to providing the desired amount of damping for the plastic coilform 14 also greatly reinforces the thin cylindrical wall of the coilform whose thickness maay be on the order of 0.005 inches.

The plastic for the coilform should have a good fatigue life and sufficient resilience. In addition the plastic material should also be sufficiently strong so that together with the mandrel 14', the coilform 14 can withstand the stresses exerted thereon. In one embodiment the plastic material was of the thermosetting type and was purchased from DuPont under the tradename Delrin. It is a linear molecular structure of acetal polymers. It has a high strength and stiffness, good fatigue life, exceptional resilience and toughness combined with low-moisture sensitivity, high solvent resistance and excellent electrical insulating characteristics. The plastic material is supplied in pellet form and the coilforms can be injection molded.

Another suitable acetal material can be purchased from the Celanese Corporation and is marketed under the tradename of CELCON.

An important characteristic of these plastic materials is their creep resistance that allows the coilforms to maintain their dimensional stability when submitted to pressure. There is significant stress on the cylindrical wall of the coilform resulting from the fine wire being wound on the relatively thin wall of the coilform. The cylindrical wall thickness of the wound coilform in the preferred embodiment is on the order of 0.005 inches. The molded coilform has an initial wall thickness of approximately 0.050 inches and after the coils are wound thereon it is bored to the required thickness of 0.005 inches. The mandrel 14' is inserted inside the coilform and then the coils are wound thereon.

The cost of manufacturing plastic coilforms in accordance with this invention compares very favorably with the cost of manufacturing finished metallic coiforms, especially when the relatively high-rate of rejection of such metallic coilforms is taken into consideration. In addition, since the coilform is made of a plastic material having good electrical insulating characteristics, the problems normally associated with sharp edges or points piercing and short circuiting the coil windings in conventional geophones is substantially completely eliminated. Other advantages will readily become apparent to those skilled in the art.

What is claimed is:

1. In a seismic electromagnetic geophone including a case having an internal chamber and an inductive coil adapted to oscillate in a magnetic field to generate electric signals responsive to the vibrations of said case, a nonmetallic coilform upon which said coil is wound, a metallic cylinder adapted to oscillate in unison with said coilform, the improvement wherein, said coilform is mounted on the outer cylindrical wall of said metallic cylinder and secured thereto in rigid relation, said magnetic field is produced by a single magnet which generates electric signal currents in said inductive coil and which also generates electric eddy currents in said metallic cylinder, said eddy currents producing damping forces on said coilform.

2. In an electromagnetic geophone comprising: a cylindrical, tubular case; magnetic field producing means in said case; a cover plate at each end of said case to seal the interior volume thereof; a hollow, generally-cylindrical plastic coilform; at least one coil wound on the outer cylindrical wall of said coilform; a pair of springs for supporting said coiforms for axial movement relative to said case, and a hollow, metallic cylinder movable in unison with said coilform; the improvement wherein:

said magnetic field producing means comprises a single permanent magnet concentric with said case; said coilform is mounted on the outer cylindrical wall of said cylinder and is secured in rigid relation thereto, said magnetic field extending through said coilform and said cylinder for inducing in said coil electric current signals responsive to the vibrations of said case and for inducing eddy currents in said cylinder also responsive to the vibrations of said case, said eddy currents dampening the movement of said coilform.

3. In an electromagnetic geophone comprising a movable coil assembly concentrically mounted inside a stationary magnetic assembly; said coil assembly including a unitary, cylindrical, nonmetallic coilform having a thin wall, at least two shoulders radially and outwardly extending from said wall, a coil nested between said shoulders, a flat spring extending across each end of said coilform, the external edges of the springs being supported by said shoulders; said magnetic assembly including a single permanent magnet concentrically mounted inside said coil assembly; said coil assembly being the inertial element of the geophone and being suspended by said springs in the cylindrical air gap provided by said magnetic assembly, whereby vibrations cause said magnetic assembly to move relative to said inertial element, the improvement comprising:

a hollow metallic cylinder concentrically secured to the inner wall of said coilform and being under the influence of said magnet, said cylinder producing damping forces upon relative movement between said assemblies.

* * * * *